F. C. McCOLLUM AND C. F. EVERETT.
REPAIR OUTFIT FOR RUBBER BOOTS, RUBBER OVERSHOES, AND LIKE ARTICLES.
APPLICATION FILED MAY 20, 1920.
1,372,179.
Patented Mar. 22, 1921.
2 SHEETS—SHEET 1.
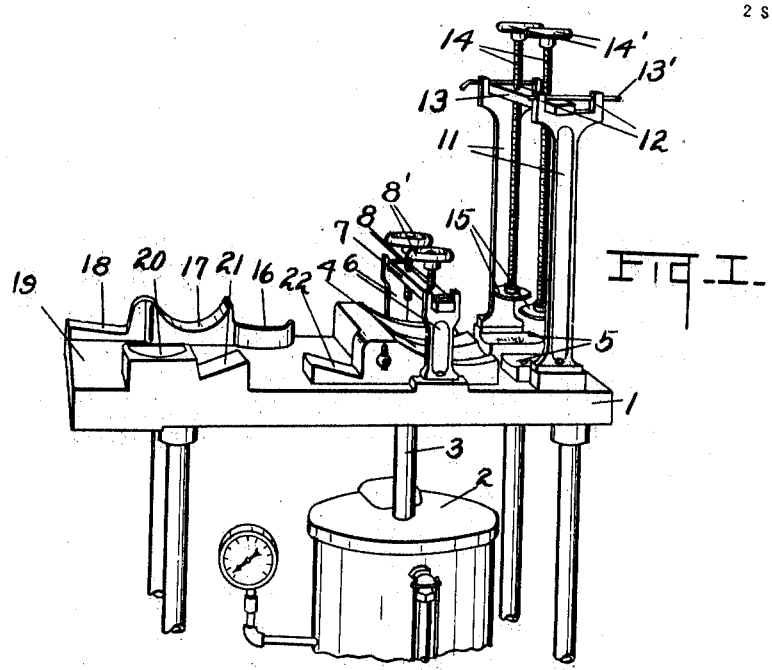
Fig. I.
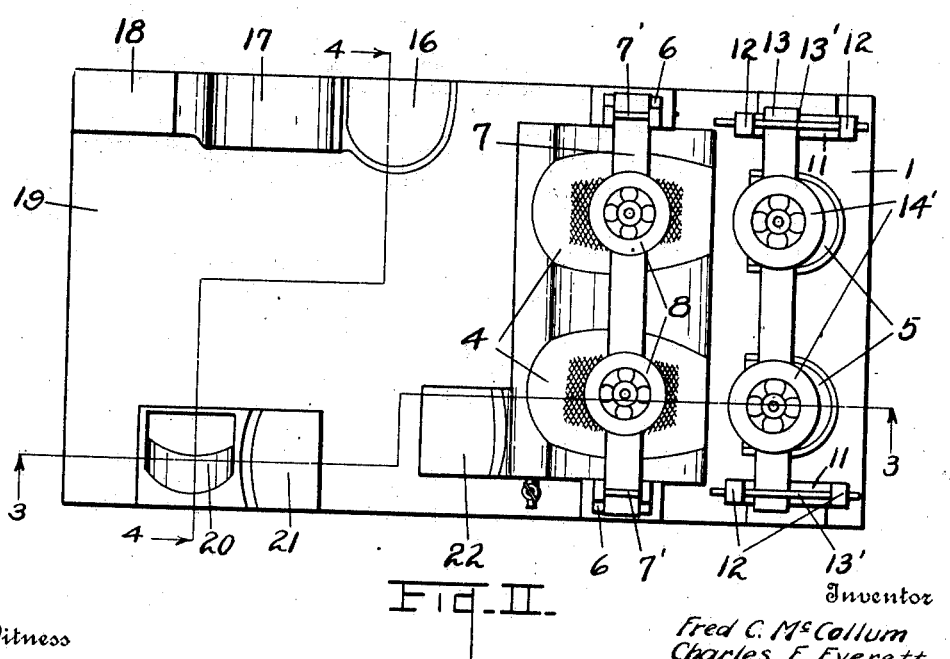
Fig. II.
Witness
Fred Ullrich
M. Louise Thurston
Inventor
Fred C. McCollum
Charles F. Everett
By Chappell & Earl
Attorneys

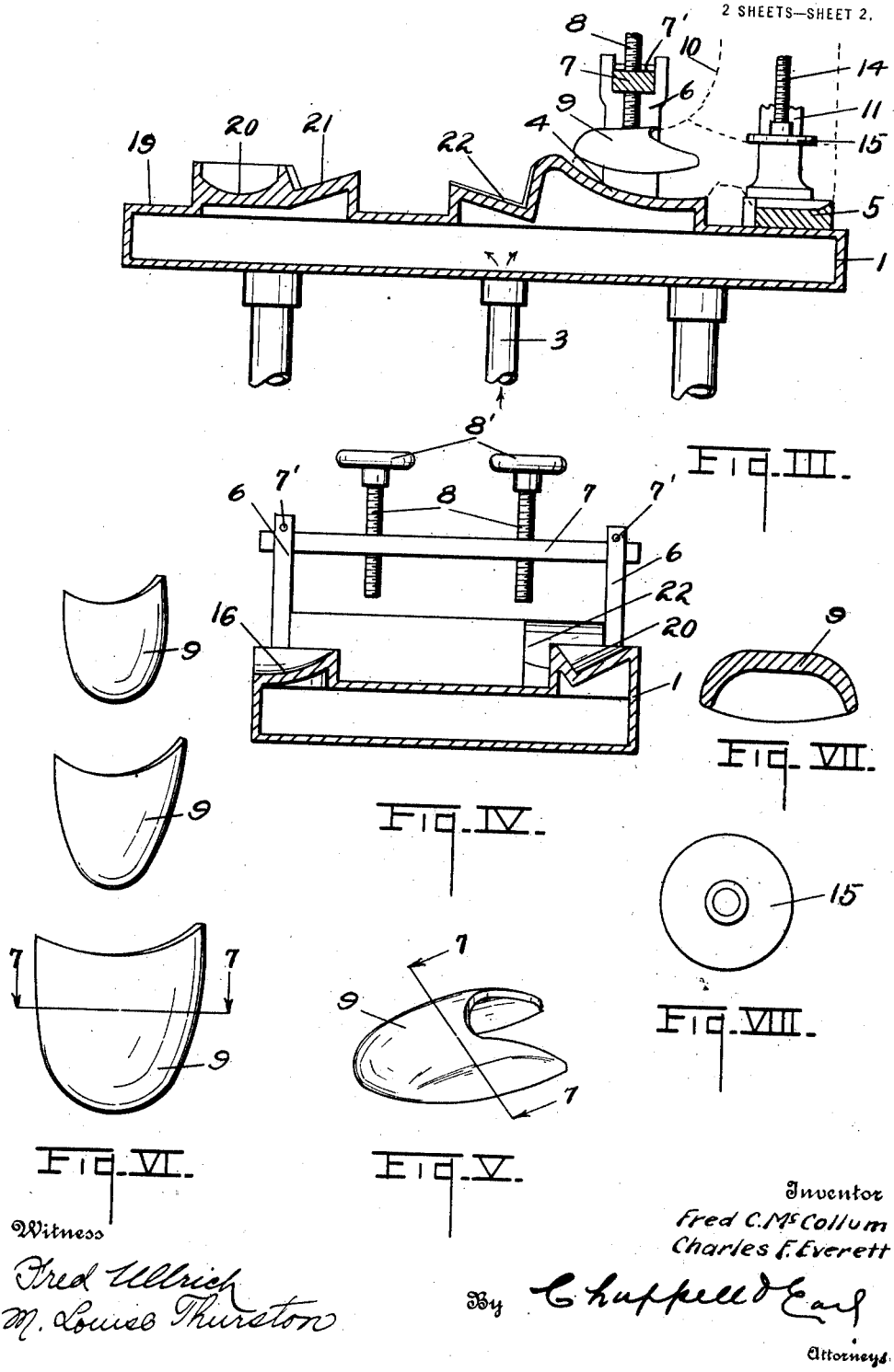

UNITED STATES PATENT OFFICE.

FRED C. McCOLLUM AND CHARLES F. EVERETT, OF JACKSON, MICHIGAN.

REPAIR OUTFIT FOR RUBBER BOOTS, RUBBER OVERSHOES, AND LIKE ARTICLES.

1,372,179. Specification of Letters Patent. Patented Mar. 22, 1921.

Application filed May 20, 1920. Serial No. 382,716.

*To all whom it may concern:*

Be it known that we, FRED C. McCOLLUM and CHARLES F. EVERETT, citizens of the United States, residing at Jackson, county of Jackson, State of Michigan, have invented certain new and useful Improvements in Repair Outfits for Rubber Boots, Rubber Overshoes, and like Articles, of which the following is a specification.

This invention relates to an improved repair outfit for rubber boots, rubber overshoes or like articles.

The object of the invention is to provide a vulcanizing device for use in the ready repair of rubber boots and the like, which is effectively and completely adjustable to the repairing of soles of rubber boots of any size.

Further objects and objects relating to details and economies of construction and operation will definitely appear from the detailed description to follow.

We accomplish the objects of our invention by the devices and means described in the following specification. The invention is clearly defined in the claims.

A structure which is a preferred embodiment of our invention is clearly illustrated in the accompanying drawing, forming part of this specification, in which:

Figure I is a perspective view of the parts of a vulcanizing repair outfit to which our invention pertains.

Fig. II is an enlarged detail plan view of the structure appearing in Fig. I.

Fig. III is a detail sectional view taken on the irregular section line 3—3 of Fig. II, a boot being indicated by dotted lines and the position of the toe plate 7 and follower 10 being shown.

Fig. IV is a detail transverse sectional view on the irregular line 4—4 of Fig. II.

Fig. V is a detail perspective view of one of the toe clamping members.

Fig. VI is a plan view of a series of toe clamping members, showing different sizes.

Fig. VII is a detail transverse sectional view of one of the toe clamping members, taken on line 7—7 of Figs. V and VI, showing the general formation of one of these toe clamps.

Fig. VIII is a detail view of one of the follow members 15 for use inside of the rubber boot.

In the drawing similar numerals of reference refer to similar parts throughout the several views, and the sectional views are taken looking in the direction of the little arrows at the ends of the section lines.

Considering the numbered parts of the drawing, 1 is a vulcanizing steam hot plate, supplied from a boiler 2 of any usual construction through the supply pipe 3 delivering in the bottom thereof. The hot plate or table 1 is supported upon suitable legs of pipe. The upper surface of this hot plate 1 is provided with a pair of concave sole vulcanizing surfaces 4, 4, suitably corrugated in the bottom to correspond to the corrugations of a rubber sole. These surfaces are made concave so that the sole will be readily fitted into the same, and of a size much larger than the usual large size of rubber boot or overshoe to be repaired therein. They will therefore permit of clamping any size sole from the largest to the smallest for affixing a new sole or a patch.

5, 5 are heel molding blocks which are movable to different positions on the hot plate 1 in proximity to and to coöperate with the sole vulcanizing surfaces 4. These are of the correct form for properly conforming to the heel of a rubber boot or overshoe and sufficiently large to take in the largest size and slightly concave to conform to any size from the largest to the smallest that may be placed thereon.

Uprights 6 are at each side of the sole vulcanizing surfaces and carry a cross bar 7 retained in place by cross pin 7'. A pair of clamp screws 8 are screw threaded in the bar 7 and are provided with hand wheels 8'. A series of toe cap plates 9 is provided to accommodate different sizes of rubber boots or overshoes, to be held in place by the screws 8.

The relation of these parts is indicated in Fig. IV, the rubber boot being indicated by dotted lines 10.

Additional uprights 11 are placed opposite the right hand end of the hot plate in position to correspond and coact with the movable heel blocks 5. Cross bars 13 are adjustably supported between upwardly projecting ears 12 on these uprights 11, being retained by the crosspins 13'. Screws 14 are threaded through the bar 13 and are provided with hand wheels 14'. On the lower ends of these screws, which are of considerable length, are disposed follow blocks 15 of a size to substantially fill the cross diameter of a rubber boot leg or the top of a rubber overshoe. In use these blocks are forced down on the filling material that may be used in the boot or shoe.

To use our improved device for the repair of rubber boots, when the sole is to be repaired a patch or an entire new sole with suitable cement or vulcanizing material is placed upon the sole of the boot. This is placed upon the sole surface 4 under the clamp and the clamp piece 9 is placed over the toe. The boot is filled preferably with rye and the clamp screw 14 forces the follower 15 down upon the rye, thus firmly distending the shoe and holding it very firmly in position, the rough character of the rye grain making the same especially desirable for such filling, although any granular material or even sawdust may be used. Pressure can thus be applied both to the sole and the heel, and the device is adjustable to any size boot from the smallest to the largest, by simply substituting a toe cap of the required size to secure the desired result and moving the heel block 5 to proper position.

On other parts of the hot plate are conform surfaces for finishing different parts of a boot or shoe, as at 16 is a place for the top of the toe, at 17 for the instep, at 18 for the flat place under the heel, at 20 for the point of the heel, at 21 for a curve on one side of the sole, at 22 for a curve on the opposite side of the sole, and at 19 is a flat surface for treatment of flat surfaces generally, such as the side of the leg of a boot. On these surfaces parts are held in place by any ordinary clamp, which it is not deemed necessary to illustrate here.

While we have shown a pair of these sole repairing devices, a single one only is needed, it being unnecessary to provide for rights and lefts.

Having thus described our invention, what we claim as new and desire to secure by Letters Patent is:

1. The combination with a vulcanizing table, of a concave vulcanizing surface suitably corrugated for the sole of a rubber boot or overshoe, a flat space back of the same, a heel plate loosely supported thereon and adjustable in its relation to the said sole part, clamping screws disposed above the said surface and heel plate, the screws over the heel plate being adjustable laterally, a series of conformed toe clamps of different sizes to embrace the toe of a rubber boot or overshoe, and a follower for disposition in the rear part of the shoe for forcing a filling material into the boot or shoe, whereby the same can be effectively clamped for vulcanizing, as specified.

2. The combination with a vulcanizing table, of a concave vulcanizing surface suitably corrugated for the sole of a rubber boot or overshoe, a flat space back of the same, a heel plate loosely supported thereon and adjustable in its relation to the said sole part, clamping screws disposed above the said surface and heel plate, the screws over the heel plate being adjustable laterally, a conformed toe clamp to embrace the toe of a rubber boot or overshoe, and a follower for disposition in the rear part of the shoe for forcing a filling material into the boot or shoe, whereby the same can be effectively clamped for vulcanizing, as specified.

3. The combination with a vulcanizing table, of a concave vulcanizing surface suitably corrugated for the sole of a rubber boot or overshoe, a flat space back of the same, a heel plate loosely supported thereon and adjustable in its relation to the said sole part, clamping screws disposed above the said surface and heel plate, the screws over the heel plate being adjustable laterally, and a conformed toe clamp to embrace the toe of a rubber boot or overshoe, as specified.

4. The combination with a vulcanizing table, of a concave vulcanizing surface suitably corrugated for the sole of a rubber boot or overshoe, a flat space back of the same, a heel plate loosely supported thereon and adjustable in its relation to the said sole part, a conformed toe clamp to embrace the toe of a rubber boot or overshoe, means for clamping the same over the boot, and a follower for disposition in the rear part of the boot for forcing a filling material into the boot, whereby the same can be effectively clamped for vulcanizing, as specified.

5. The combination with a vulcanizing table, of a concave vulcanizing surface suitably corrugated for the sole of a rubber boot or overshoe, a flat space back of the same, a heel plate loosely supported thereon and adjustable in its relation to the said sole part, and means of clamping a boot thereto, as specified.

6. The combination with a vulcanizing table, of a concave vulcanizing surface suitably corrugated for the sole of a rubber boot or overshoe, a conformed toe clamp to embrace the toe of a rubber boot or overshoe and a heel plate adjustably associated with the said sole vulcanizing surface, as specified.

7. The combination with a vulcanizing table, of a concave vulcanizing surface suitably corrugated for the sole of a rubber boot or overshoe, a filling material such as rye, with means for retaining it in the boot or overshoe, and a conformed toe clamp to embrace the toe of the rubber boot or overshoe, as specified.

In witness whereof we have hereunto set hands and seals in the presence of two witnesses.

FRED C. McCOLLUM. [L. S.]
CHARLES F. EVERETT. [L. S.]

Witnesses:
  EDITH AUSTIN,
  MABEL ALLINGTON.